(12) United States Patent
Ito et al.

(10) Patent No.: US 6,485,043 B2
(45) Date of Patent: Nov. 26, 2002

(54) FRONT SUSPENSION STRUCTURE FOR MOTORCYCLE

(75) Inventors: Shinji Ito, Saitama (JP); Toshiyuki Iwai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/783,089

(22) Filed: Feb. 15, 2001

(65) Prior Publication Data

US 2001/0026058 A1 Oct. 4, 2001

(30) Foreign Application Priority Data

Feb. 15, 2000 (JP) ........................................ 2000-036056

(51) Int. Cl.[7] .............................................. B60K 28/10
(52) U.S. Cl. ........................ 280/276; 280/275; 280/277; 280/279; 280/286; 403/54
(58) Field of Search ................................ 280/276, 277, 280/283, 286, 279; 248/291.1, 299.1; 403/54, 62, 150, 157

(56) References Cited

U.S. PATENT DOCUMENTS

| 3,954,284 A | * | 5/1976 | Phillips et al. | ............... | 280/277 |
|---|---|---|---|---|---|
| 4,180,280 A | * | 12/1979 | Doveri | ........................ | 280/277 |
| 4,775,163 A | * | 10/1988 | McGowan et al. | .......... | 280/277 |
| 4,776,609 A | * | 10/1988 | Pan et al. | ................... | 280/703 |
| 5,186,274 A | * | 2/1993 | Hegman | ...................... | 180/227 |
| 6,152,472 A | * | 11/2000 | Woodside | .................... | 280/277 |
| 6,155,370 A | * | 12/2000 | Iwai et al. | ................... | 180/222 |
| 6,164,675 A | * | 12/2000 | Pickering | ..................... | 280/277 |
| 6,336,647 B1 | * | 1/2002 | Iwai et al. | ................... | 180/219 |
| 2001/0019197 A1 | * | 9/2001 | Ito et al. | ...................... | 280/276 |

FOREIGN PATENT DOCUMENTS

| FR | 2687976 | * | 9/1993 | |
|---|---|---|---|---|
| GB | 2106843 A | * | 4/1983 | ........... B62K/25/24 |
| JP | 2647396 | | 6/1994 | |

\* cited by examiner

*Primary Examiner*—Anne Marie Boehler
*Assistant Examiner*—Daniel Yeagley
(74) *Attorney, Agent, or Firm*—Birch, Stewart, Kolasch & Birch, LLP

(57) ABSTRACT

A front suspension structure is provided having an axle support arm for connecting a front wheel axle and a front fork lower end that is light in weight and has high rigidity. An axle support arm has a substantially chevron shape when viewed from the side, with a front end section being formed as a two-legged section for connecting to an arm holder for a lower end of a front fork. The two-legged section is rotatably connected to the arm holder via a bolt. A rear end of the axle support arm includes a bearing section provided with a slot. The axle support arm is rotatably connected to an axle via the bearing section. Indentations that open upwardly are formed in a central part of the axle support arm with bearing sections provided on lower ends of the push-rods being fitted in the indentations and a bolt inserted into the bearing sections from a side direction.

12 Claims, 5 Drawing Sheets

FRONT SUSPENSION STRUCTURE FOR MOTORCYCLE

CROSS-REFERENCE TO RELATED APPLICATIONS

The present application claims priority under 35 U.S.C. § 119 to Japanese Patent Application No. 2000-036056 filed on Feb. 15, 2000.

BACKGROUND OF THE INVENTION

Field of the Invention

The present invention relates to a front suspension structure for a motorcycle or the like, in which a shock absorber and a front fork are separated.

Description of Background Art

As a motorcycle front suspension structure, a shock absorber is not assembled inside a front fork, but is arranged independently, as shown in FIG. 6. With this front suspension structure, a steering stem 101 is attached to a head pipe 100 so as to be capable of rotation, a top bridge 102 is provided on an upper end of the steering stem 101 while a bottom bridge 103 is provided on a lower end, a front fork 104 is supported by the top bridge 102 and the bottom bridge 103, the lower end of the front fork 104 and an axle 105 of the front wheel are linked by an axle support shaft 106, an upper end of a shock absorber 107 is attached to a cushion upper bracket 113 arranged on a lower end of the top bridge 102, a lower end of the shock absorber 107 is attached to a cushion arm 108 having one end pivoted at the bottom bridge 103, the cushion arm 108 and the axle support shaft 105 are linked by a push rod 109, and the vibration of the axle support shaft 105 is conveyed to the shock absorber 108 through the push rod 109 and the cushion arm 108.

It is possible to adjust the length of the push rod 109, making it possible to easily change the setting of the damping characteristics, and a lower end section of the push rod 109 has a two-legged section 110, as shown in FIG. 7, with a bearing section 111 of the axle support arm being fitted inside the two-legged section and joined from the side using a bolt 112.

A related structure is disclosed in Japanese Patent laid-open No. Hei. 6-47396, wherein a shock absorber is arranged between an axle support arm and a front fork without a push rod being provided. Vibrations of the axle support arm are conveyed to the shock absorber directly.

Regardless of the way in which the vibrations of the axle support shaft are conveyed to the shock absorber, the lower end of a shock absorber or push rod connecting to the axle support arm has a two-legged section 110, as described above. Therefore, if the axle support arm vibrates, the relationship between the two-legged section 110 and the axle support arm 105 is as shown in FIGS. 8(a)–(c).

Accordingly, in order to prevent interference between the two-legged section 110 and the axle support arm 105 it is necessary to make both sides 111a, 111a of sections that provide a bearing section 111 of the axle support arm in a hollowed out shape. In order to endow the axle support arm with the necessary rigidity for these conditions, the axle support arm must be made thick, which increases the weight.

SUMMARY AND OBJECTS OF THE INVENTION

In order to solve the above described problems, the present invention provides a front suspension structure for a motorcycle, having an axle support arm linking between a lower end of a front fork and a front wheel axle, with the rotation of the axle support arm being conveyed to a shock absorber either directly or through a push rod, wherein indented sections opening upwards are formed in the axle support arm, a lower end of the push rod or a lower end of the shock absorber is fitted into the indented section, and is rotatably linked to a shaft from a side direction via a bearing.

In this way, by making the shape of the axle support arm like an arc or a chevron, there is no need to consider avoiding interference between the axle support arm and the lower end of the pushrod or the lower end of the shock absorber, and the degree of freedom with regard to the shape is increased, making it possible to achieve the necessary rigidity without any accompanying increase in weight.

Also, by using a bolt as a shaft for rotatably supporting a lower end of the push rod or a lower end of the shock absorber, and positioning a head section of this bolt at a front wheel side, the bolt head section is not externally exposed, improving the external appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
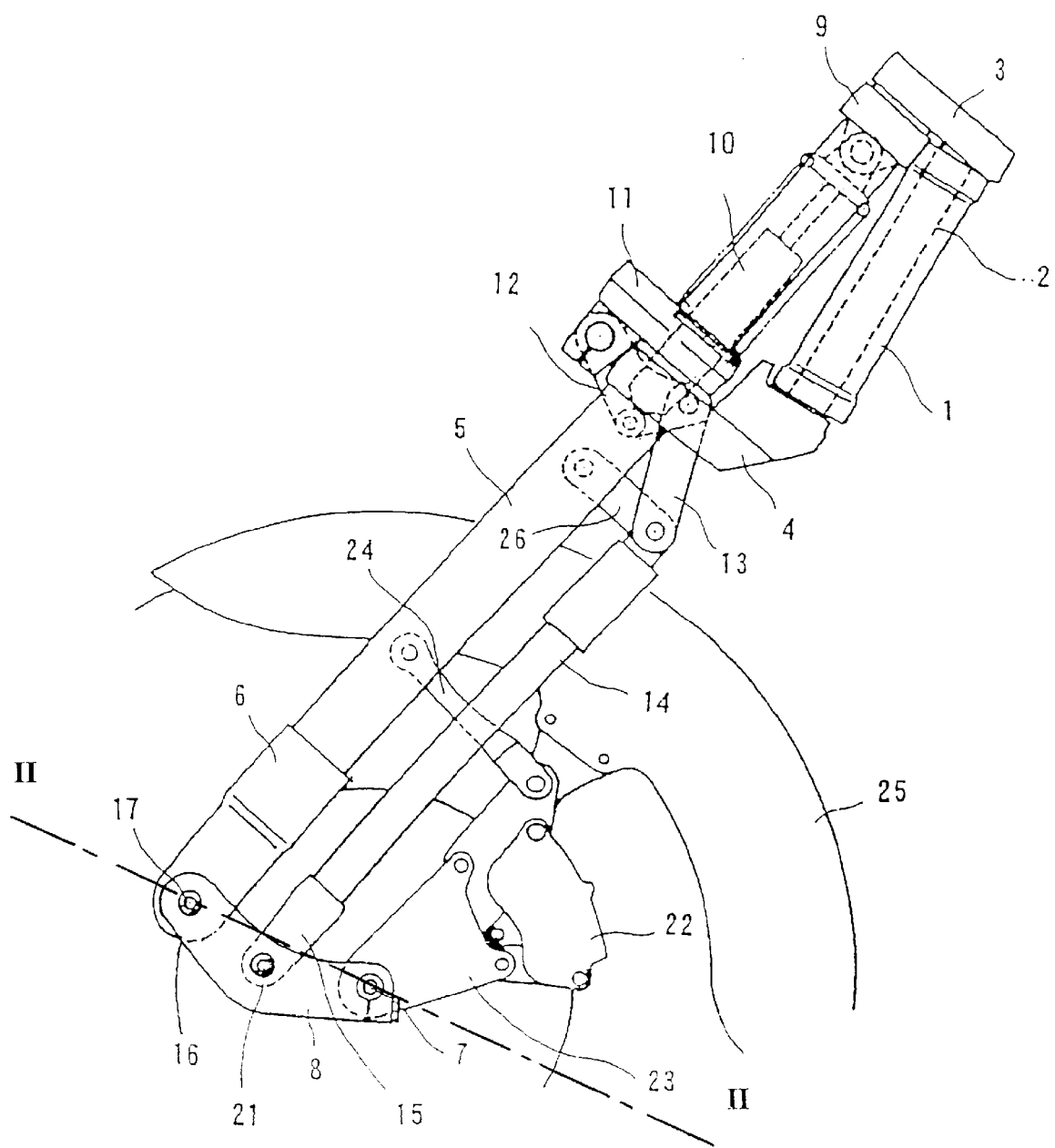
FIG. 1 is a side elevation of essential parts of a motorcycle to which a front suspension structure of the present invention is applied.
Figure 2:
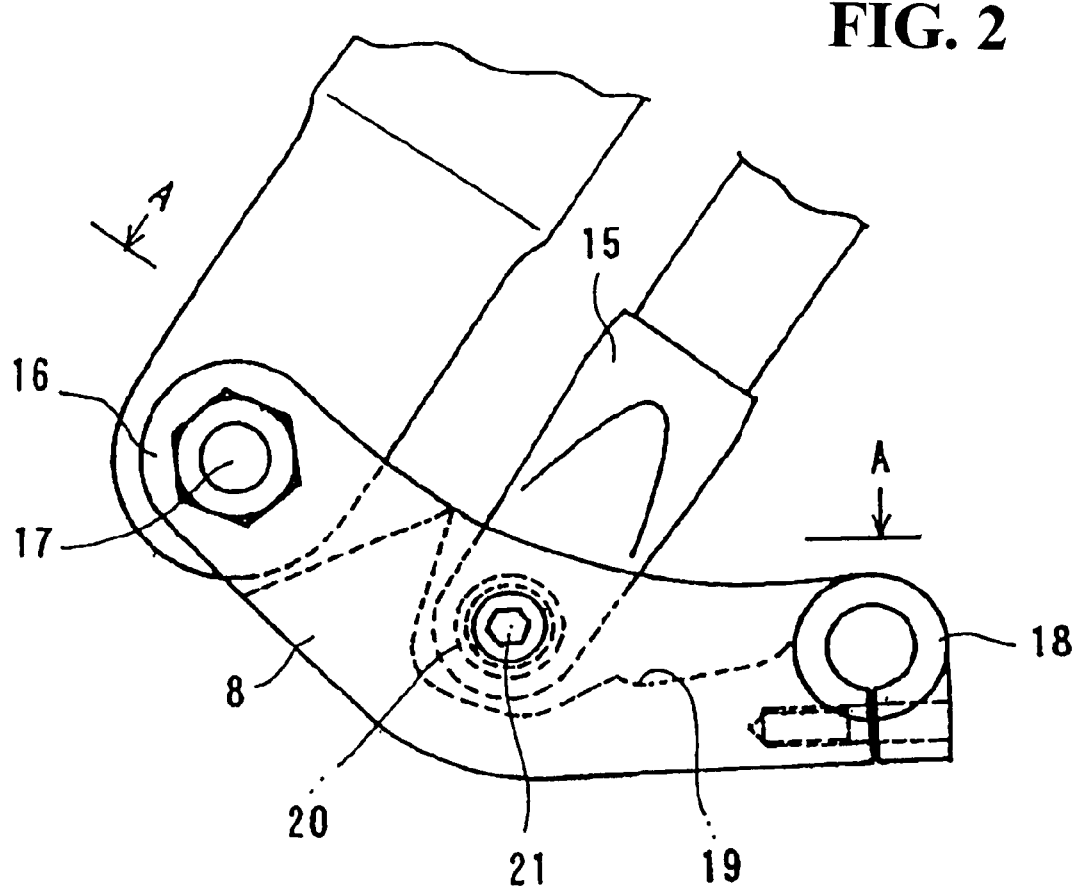
FIG. 2 is an enlarged side elevation of an axle support arm constituting a front suspension structure of the present invention.
Figure 3:
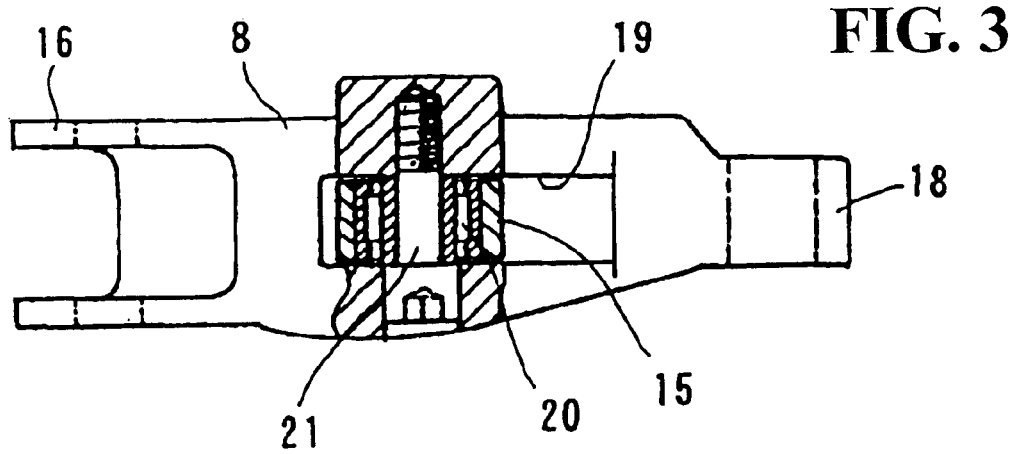
FIG. 3 is a perspective drawing in the direction of arrows A—A in FIG. 2.

Embodiments of the present invention will be described below based on the attached drawings. FIG. 1 is a side elevation of essential parts of a motorcycle to which a front suspension structure of the present invention is applied, FIG. 2 is an enlarged side elevation of a motorcycle to which a front suspension structure of the present invention is applied, and FIG. 3 is a perspective view in the direction of arrows A—A in FIG. 2.

As illustrated in FIG. 1, a steering stem 2 is inserted into a head pipe 1 to permit rotation. A top bridge 3 is provided on an upper end of the steering stem 2 and a bottom bridge 4 is provided on a lower end of the steering system 2. An upper part of a front fork 5 is supported by the top bridge 3 and the bottom bridge 4, a lower end of the front fork 5 is inserted into an arm holder 6, and one end of an axle support arm (pivot arm) 8 is rotatably attached to an axle 7 of the front wheel. The axle support arm 8 will be described in detail later.

Also, an upper end of the shock absorber 10 is rotatably attached to the top bridge via an attachment stay 9, a cushion arm attachment stay 11 is fixed to the front fork 5 so as to overlap the bottom bridge 4, one end of a cushion arm 12 is swingably supported on the cushion arm attachment stay, and a lower end of the shock absorber 10 is rotatably attached to a middle section of the cushion arm 12.

An upper end of a connecting member 13 is rotatably linked to the other end of the cushion arm 12, an upper end of a push rod 14 is rotatably linked to a lower end of the connecting member 13, and a lower end section 15 of the push rod 14 is rotatably linked to a middle section of the axle support arm 8.

That is, the axle support shaft 8 has a substantially chevron shape when viewed from the side, and a front end section has a two-legged section 16 for connecting to an arm holder 6 for the lower end of the front fork 5, and this two-legged section 16 is rotatably connected to the arm holder 6 via a bolt 17. Also, a rear end of the axle support arm 8 has a bearing section 18 provided with a slit, and the axle support arm 8 is rotatably connected to the axle 7 via the bearing section 18.

Also, indentations 19 opening upwards are formed in a central part of the axle support shaft, a bearing section 20 provided on the lower end section 15 of the push rod is enclosed inside the indentations 19, and a bolt 21 is fitted into the bearing section 20 from a side direction. In this way, the axle support arm 8, and the front fork 5, the axle 7 and the push rod 14 are all rotatably connected. FIG. 1 shows bolt 21 being located beneath Line II extending between bolt 17 and axle 7 at opposite ends of the axle support arm 8.

An upper arm 26 is rotatably suspended between the upper end of the push rod 14 and the front fork 5, and a quadrilateral link is formed by the upper arm 26, front fork 5, push rod 14 and the axle support arm 8.

Further, one end of an attachment stay 23 for a brake caliper 22 is attached to the front wheel axle 7, a torque link 24 is suspended between the other end of the attachment stay 23 and the front fork 5, and a fender 25 is attached to the attachment stay 23.

Figure 4:
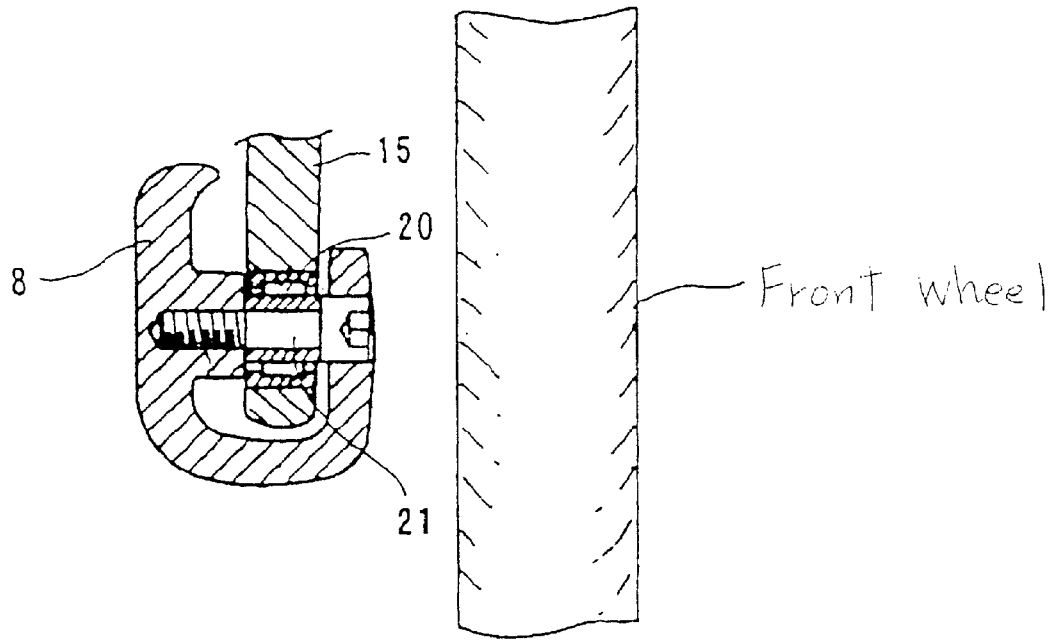
FIG. 4 is a cross section showing another embodiment.

FIG. 4 is a cross sectional drawing showing another embodiment, and in this embodiment the head section of the bolt 21 is on a side facing the front wheel. With such a structure, the head section of the bolt 21 is not exposed to the outer surface of the axle support arm, which improves the external appearance.

Figure 5:
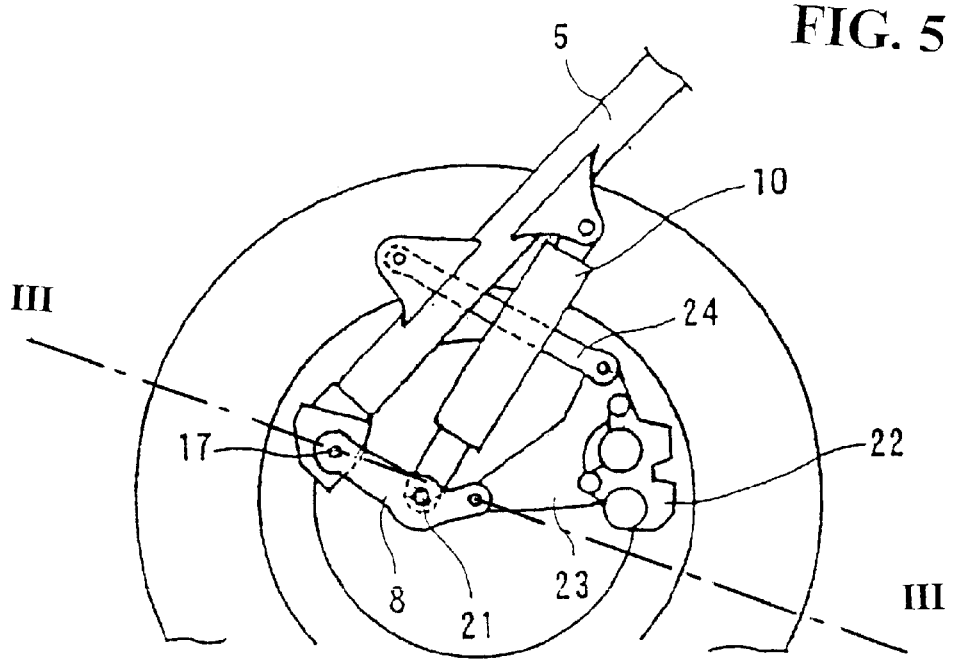
FIG. 5 is a side elevation of essential parts of a motorcycle showing another embodiment.
Figure 6:
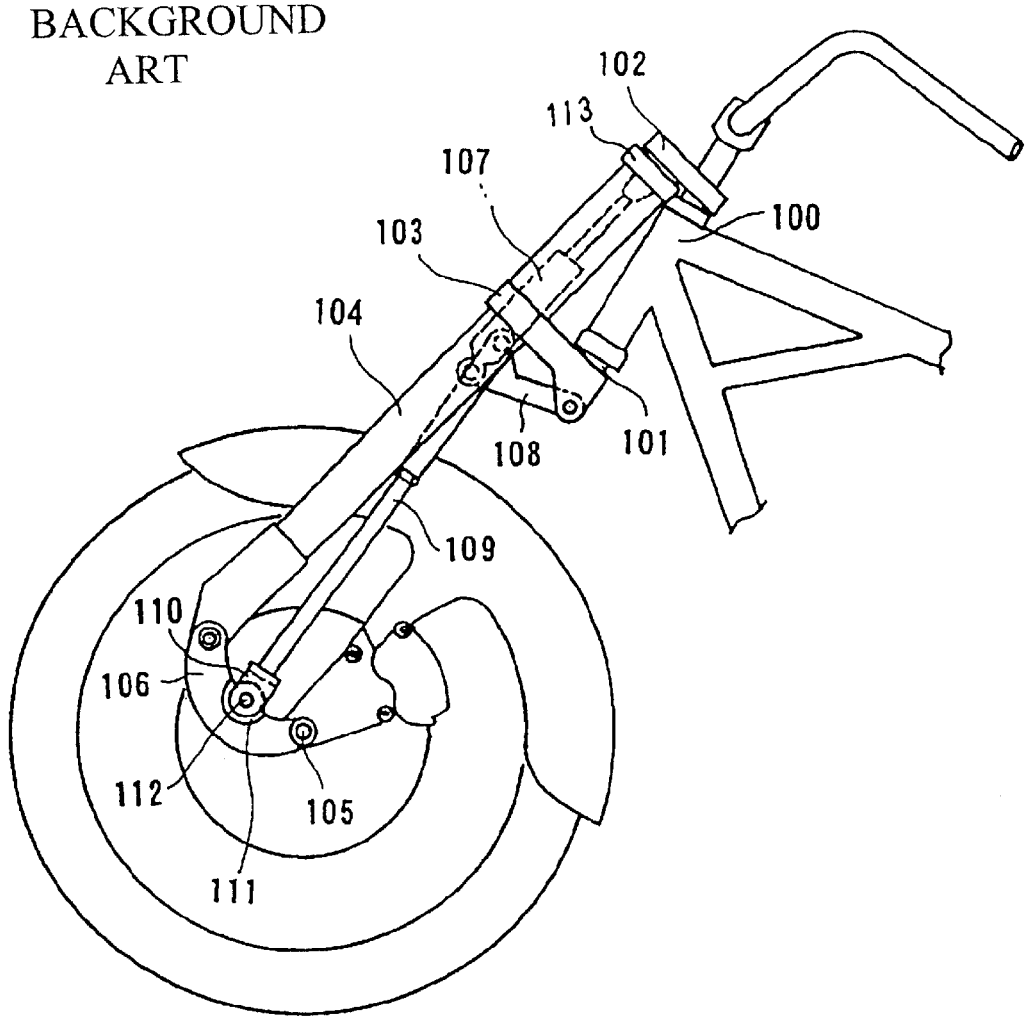
FIG. 6 is a side elevation of essential parts of a motorcycle showing a link type suspension structure of background art.
Figure 7:
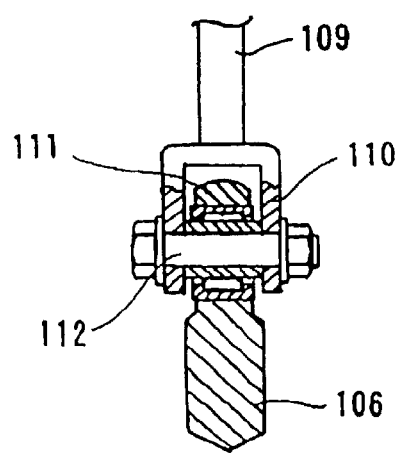
FIG. 7 is an enlarged drawing viewed from direction B in FIG. 6.
Figure 8A:
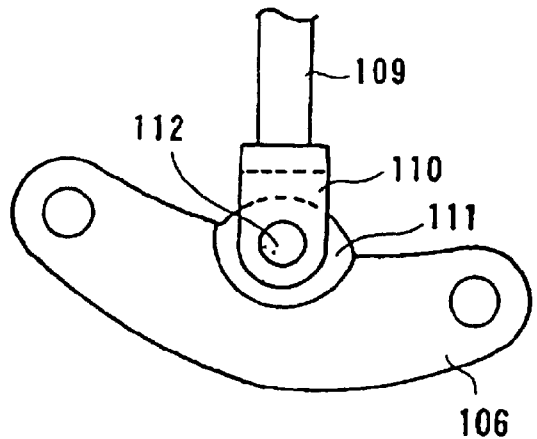
FIGS. 8(a)–(c) are drawings for explaining movement of a front suspension structure of background art.
Figure 8B:
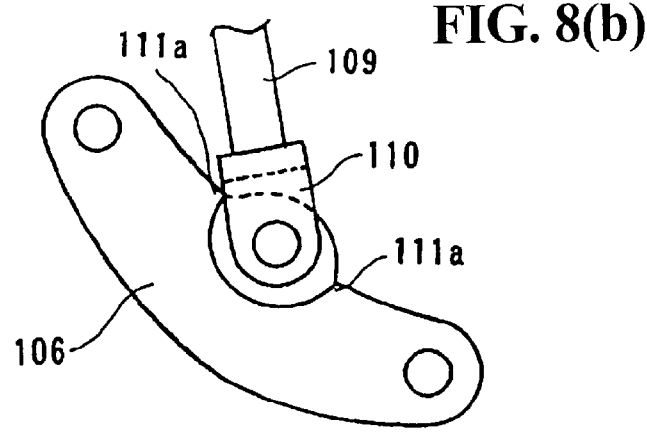
Figure 8C:
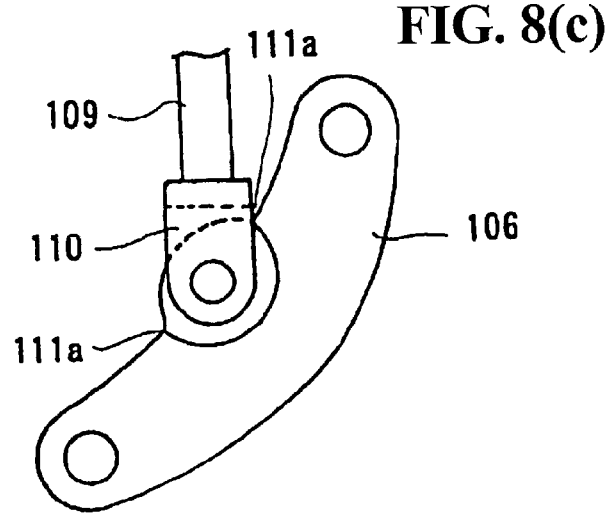

FIG. 5 is a side elevation of essential parts of a motorcycle showing another embodiment, and in the previous embodiment vibration of the axle support arm 8 is conveyed to the shock absorber via the push rod 14, but with this embodiment, by connecting the lower end of the shock absorber 10 to the axle support arm 8, and connecting an upper end of the shock absorber to a middle section of the front fork 5, vibration of the axle support arm 8 is directly conveyed to the shock absorber 10. FIG. 5 shows bolt 21 being located beneath Line III extending between bolt 17 and the axle at opposite ends of the axle support arm 8.

According to the present invention as described above, in a motorcycle front suspension structure having a shock absorber separate from the front fork, the shape of axle support arms connecting a front wheel axle and lower ends of the front fork are formed with indented sections opening upwards. Since the lower ends of the push rods or lower ends of the shock absorbers are fitted into these indentations and the lower ends of the pushrods or the lower ends of the shock absorbers are rotatably connected to a shaft from the side via a bearing, the degree of freedom with respect to the shape of the axle support arms is increased, and it is possible to achieve the necessary rigidity without an accompanying increase in weight.

Particularly, by rotatably connecting lower ends of the push rods and lower ends of the shock absorbers, if a bolt is inserted from a front wheel side the bolt head is not exposed to the outside, thus improving the external appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front suspension structure for a motorcycle, having an axle support arm linking between a lower end of a front fork and a front wheel axle, with rotation of the axle support arm being conveyed to a shock absorber either directly or through a push rod comprising:

an indented section and opening upwardly and being formed in the axle support arm;

a lower end of the push rod or a lower end of the shock absorber being enclosed inside the indented section, wherein the push rod has an upper end rotatably connected to both a connecting member and an upper arm, or the shock absorber has an upper end rotatably connected to the front fork;

a shaft positioned between said lower end of the push rod or the lower end of the shock absorber and said axle support arm; and a bearing positioned on said shaft for rotatably mounting said lower end of the push rod or the lower end of the shock absorber to said axle support arm, said axle support arm being arc or chevron shaped and including a first end rotatably mounted relative to said front fork, a middle portion including said indented section for mounting said lower end of the push rod or the lower end of the shock absorber, and a distal end for mounting a front wheel axle, said middle portion including said indented section being disposed at a point beneath a line between said first end and said distal end.

2. The front suspension structure for a motorcycle according to claim 1, wherein the shaft for rotatably supporting the lower end of the push rod or the lower end of the shock absorber is a bolt, and a head of the bolt is positioned on a side of a front wheel.

3. The front suspension structure for a motorcycle according to claim 1, wherein said axle support arm has a predetermined width and said indented section is formed within the width dimension of said axle support arm.

4. The front suspension structure for a motorcycle according to claim 1, wherein said axle support arm includes a first end having two sections for attachment to said front fork and a distal end for receiving a front wheel axle.

5. The front suspension structure for a motorcycle according to claim 1, wherein said indented section extends from the middle portion of said axle support arm towards the distal end to permit the lower end of the push rod or the lower end of the shock absorber to rotate within said indented section towards the front wheel axle.

6. The front suspension structure for a motorcycle according to claim 1, wherein said axle support arm includes a threaded section disposed adjacent to the indented section for receiving a threaded section of said shaft inserted from a side of a front wheel for presenting an unblemished exterior portion of the axle support arm.

7. A front suspension structure for a motorcycle comprising:
- a front fork having a lower end and an upper end;
- a front wheel axle for supporting a front wheel of a motorcycle;
- a shock absorber for absorbing vibrations;
- an axle support arm linking between the lower end of the front fork and the front wheel axle, said axle support arm being mounted for movement wherein movement of the axle support arm is conveyed to the shock absorber either directly or through a push rod;
- an indented section opening upwardly and being formed in the axle support arm;
- a lower end of the push rod or a, lower end of the shock absorber being enclosed inside the indented section, wherein the push rod has an upper end rotatably connected to both a connecting member and an upper arm, or the shock absorber has an upper end rotatably connected to the front fork;
- a shaft positioned between said lower end of the push rod or the lower end of the shock absorber and said axle support arm; and
- a bearing positioned on said shaft for rotatably mounting said lower end of the push rod or the lower end of the shock absorber to said axle support arm,
- said axle support arm being arc or chevron shaped and including a first end rotatably mounted relative to said front fork, a middle portion including said indented section for mounting said lower end of the push rod or the lower end of the shock absorber, and a distal end for mounting a front wheel axle, said middle portion including said indented section being disposed at a point beneath a line between said first end and said distal end.

8. The front suspension structure for a motorcycle according to claim 7, wherein the shaft for rotatably supporting the lower end of the push rod or the lower end of the shock absorber is a bolt, and a head of the bolt is positioned on a side of a front wheel.

9. The front suspension structure for a motorcycle according to claim 7, wherein said axle support arm has a predetermined width and said indented section is formed within the width dimension of said axle support arm.

10. The front suspension structure for a motorcycle according to claim 7, wherein said axle support arm includes a first end having two sections for attachment to said front fork and a distal end for receiving a front wheel axle.

11. The front suspension structure for a motorcycle according to claim 7, wherein said indented section extends from the middle portion of said axle support arm towards the distal end to permit the lower end of the push rod or the lower end of the shock absorber to rotate within said indented section towards the front wheel axle.

12. The front suspension structure for a motorcycle according to claim 7, wherein said axle support arm includes a threaded section disposed adjacent to the indented section for receiving a threaded section of said shaft inserted from a side of a front wheel for presenting an unblemished exterior portion of the axle support arm.

* * * * *